(12) United States Patent
Williams

(10) Patent No.: US 10,422,630 B2
(45) Date of Patent: Sep. 24, 2019

(54) INTERFEROMETRY SYSTEM AND ASSOCIATED METHODS

(71) Applicant: University of Utah Research Foundation, Salt Lake City, UT (US)

(72) Inventor: Clayton C. Williams, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/537,297

(22) PCT Filed: Dec. 21, 2015

(86) PCT No.: PCT/US2015/067226
§ 371 (c)(1),
(2) Date: Jun. 16, 2017

(87) PCT Pub. No.: WO2016/100986
PCT Pub. Date: Jun. 23, 2016

(65) Prior Publication Data
US 2018/0051980 A1 Feb. 22, 2018

Related U.S. Application Data

(60) Provisional application No. 62/094,875, filed on Dec. 19, 2014.

(51) Int. Cl.
*G01B 9/02* (2006.01)
*G01B 11/14* (2006.01)
(52) U.S. Cl.
CPC .......... *G01B 11/14* (2013.01); *G01B 9/02003* (2013.01); *G01B 9/02024* (2013.01); *G01B 9/02027* (2013.01); *G01B 9/02041* (2013.01); *G01B 2290/45* (2013.01)

(58) Field of Classification Search
CPC ........ G01B 9/02; G01B 11/02; G01B 11/026; G01D 5/266; G01D 5/38
USPC ........................................................ 356/482
See application file for complete search history.

(56) References Cited

U.S. PATENT DOCUMENTS

| 3,643,101 | A | | 2/1972 | Shipp et al. |
| 4,600,299 | A | | 7/1986 | Abshire |
| 4,675,522 | A | | 6/1987 | Arunkumar |
| 4,941,744 | A | | 7/1990 | Yokokura et al. |
| 5,153,667 | A | * | 10/1992 | Aoshima ................ G01R 1/071 356/218 |
| 5,200,795 | A | | 4/1993 | Kim et al. |

(Continued)

FOREIGN PATENT DOCUMENTS

WO WO 2008/142389 11/2008
WO WO 2011/109895 A1 9/2011

OTHER PUBLICATIONS

Bahrampour et al.; "Optical Fiber Interferometers and Their Applications." Interferometry—Research and Applications in Science and Technology; Intech; Mar. 21, 2012; pp. 3-30.

(Continued)

*Primary Examiner* — Md M Rahman
(74) *Attorney, Agent, or Firm* — Workman Nydegger

(57) ABSTRACT

Devices, systems, and methods for determining a distance between at least two points are disclosed and described, wherein interferometry technology is utilized to determine such distances.

12 Claims, 8 Drawing Sheets

(56) References Cited

U.S. PATENT DOCUMENTS

| | | | |
|---|---|---|---|
| 5,218,419 A | 6/1993 | Lipson et al. | |
| 5,311,592 A | 5/1994 | Udd | |
| 5,392,117 A | 2/1995 | Belleville et al. | |
| 5,541,730 A | 7/1996 | Chaney | |
| 5,790,255 A | 8/1998 | Jackson et al. | |
| 6,233,263 B1 | 5/2001 | Chang-Hasnain et al. | |
| 6,687,008 B1 | 2/2004 | Peale et al. | |
| 6,825,935 B2 | 11/2004 | Nakamura et al. | |
| 7,009,710 B2 | 3/2006 | Sullivan et al. | |
| 7,508,523 B2 | 3/2009 | Chang et al. | |
| 7,619,719 B2 | 11/2009 | Rohner et al. | |
| 8,094,292 B2 | 1/2012 | Park et al. | |
| 8,334,982 B2 | 12/2012 | Fang-Yen et al. | |
| 8,379,295 B2 | 2/2013 | Zheng et al. | |
| 8,514,404 B2 | 8/2013 | Podoleanu | |
| 2002/0093648 A1* | 7/2002 | Nikoonahad | G01N 21/211 356/237.1 |
| 2002/0122186 A1* | 9/2002 | Igaki | G01D 5/36 356/616 |
| 2003/0223672 A1* | 12/2003 | Joyner | G02B 6/12011 385/14 |
| 2005/0018202 A1* | 1/2005 | Wang | A61B 5/0059 356/479 |
| 2006/0088076 A1* | 4/2006 | Lubianiker | G01J 5/0003 374/121 |
| 2010/0092176 A1 | 4/2010 | Hartog et al. | |
| 2010/0157310 A1 | 6/2010 | Bennett et al. | |
| 2012/0105861 A1 | 5/2012 | Weitzel | |
| 2014/0034833 A1* | 2/2014 | Parks, II | G01N 21/3504 250/341.2 |

OTHER PUBLICATIONS

PCT Application No. PCT/US15/67226 Filing Date Dec. 21, 2015; Clayton Williams International Search Report dated May 12, 2016; 10 Pages.

Miller.; "Reconfigurable Add-Drop Multiplexer for Spatial Modes." Optics Express; Optical Society of America; Aug. 21, 2013; vol. 21, Issue 17; 10 Pages.

Miller.; "Self-Configuring Universal Linear Optical Component." Photonics Research; Optical Society of America; 2013; vol. 1, Issue 1; pp. 1-15.

U.S. Appl. No. 16/313,431, filed Dec. 26, 2018, Williams.

International Search Report and Written Opinion of PCT/US2017/039151 dated Oct. 2, 2017.

* cited by examiner

US 10,422,630 B2

INTERFEROMETRY SYSTEM AND ASSOCIATED METHODS

BACKGROUND

Interferometry is a measurement technique that involves the superimposition of waves. One of the many advantages of interferometry includes the ability to achieve measurements with nanometer scale accuracy. Hence, it has been used extensively in metrology, micro-fabrication, quantum mechanics, and numerous other fields. Interferometry can also be useful for measuring displacement, refractive index changes, and numerous other variables.

BRIEF DESCRIPTION OF THE DRAWINGS

For a fuller understanding of the nature and advantage of the present invention, reference is being made to the following detailed description of preferred embodiments and in connection with the accompanying drawings, in which.

DESCRIPTION OF EMBODIMENTS

Figure 1:
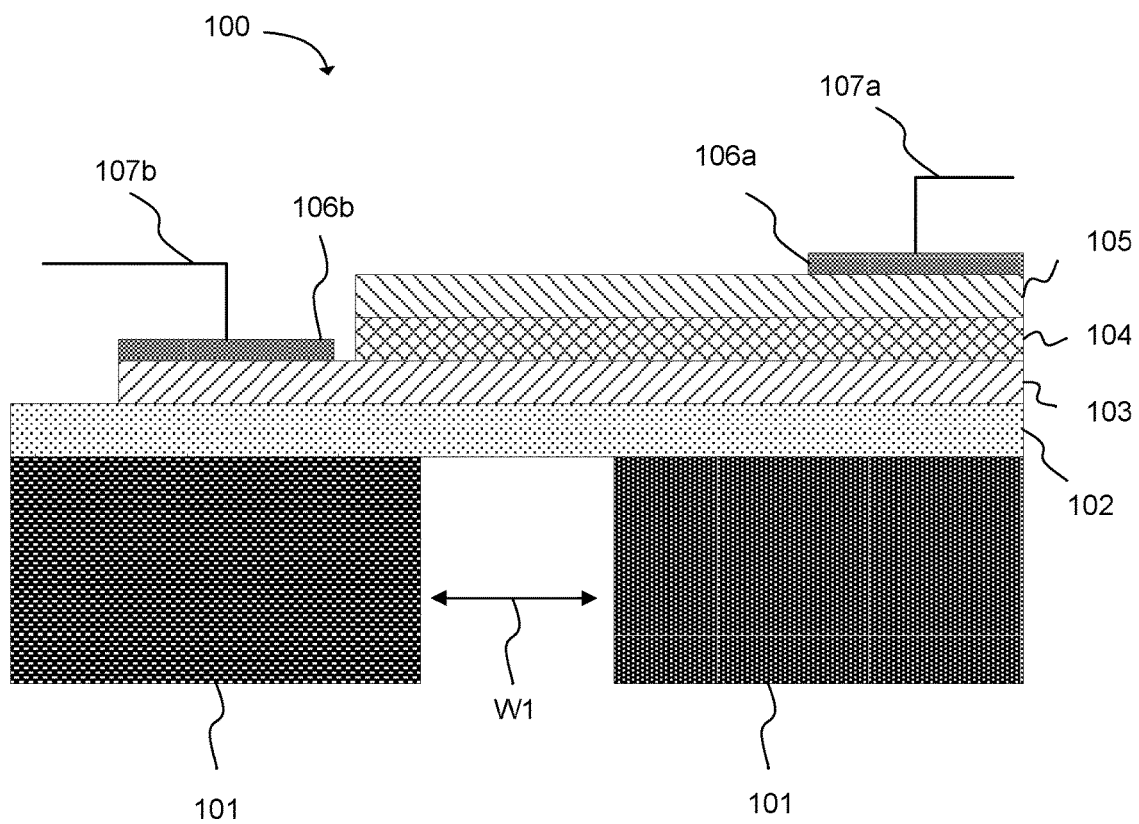
FIG. 1 is cross-sectional view of an example photodetector in accordance with an aspect of the present disclosure.

Although the following detailed description contains many specifics for the purpose of illustration, a person of ordinary skill in the art will appreciate that many variations and alterations to the following details can be made and are considered to be included herein.

Accordingly, the following embodiments are set forth without any loss of generality to, and without imposing limitations upon, any claims set forth. It is also to be understood that the terminology used herein is for the purpose of describing particular embodiments only, and is not intended to be limiting. Unless defined otherwise, all technical and scientific terms used herein have the same meaning as commonly understood by one of ordinary skill in the art to which this disclosure belongs.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

As used herein, "enhanced," "improved," "performance-enhanced," "upgraded," and the like, when used in connection with the description of a device or process, refers to a characteristic of the device or process that provides measurably better form or function as compared to previously known devices or processes. This applies both to the form and function of individual components in a device or process, as well as to such devices or processes as a whole.

As used herein, "coupled" refers to a relationship of physical connection or attachment between one item and another item, and includes relationships of either direct or indirect connection or attachment. Any number of items can be coupled, such as materials, components, structures, layers, devices, objects, etc.

As used herein, "directly coupled" refers to a relationship of physical connection or attachment between one item and another item where the items have at least one point of direct physical contact or otherwise touch one another. For example, when one layer of material is deposited on or against another layer of material, the layers can be said to be directly coupled.

As used herein, "associated with" refers to a relationship between one item, property, or event and another item, property, or event. For example, such a relationship can be a relationship of communication. Additionally, such a relationship can be a relationship of coupling, including direct, indirect, electrical, or physical coupling. Furthermore, such a relationship can be a relationship of timing.

Objects or structures described herein as being "adjacent" to each other may be in physical contact with each other, in close proximity to each other, or in the same general region or area as each other, as appropriate for the context in which the phrase is used.

In this application, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of"

or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term, like "comprising" or "including," it is understood that direct support should be afforded also to "consisting essentially of" language as well as "consisting of" language as if stated explicitly, and vice versa.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Further, a listing of components, species, or the like in a group is done for the sake of convenience and that such groups should be interpreted not only in their entirety, but also as though each individual member of the group has been articulated separately and individually without the other members of the group unless the context dictates otherwise. This is true of groups contained both in the specification and claims of this application. Additionally, no individual member of a group should be construed as a de facto equivalent of any other member of the same group solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

Reference throughout this specification to "an example" means that a particular feature, structure, or characteristic described in connection with the example is included in at least one embodiment. Thus, appearances of the phrases "in an example" in various places throughout this specification are not necessarily all referring to the same embodiment.

Example Embodiments

An initial overview of technology embodiments is provided below and specific technology embodiments are then described in further detail. This initial summary is intended to aid readers in understanding the technology more quickly, but is not intended to identify key or essential technological features, nor is it intended to limit the scope of the claimed subject matter.

The present disclosure relates to novel interferometry devices, systems, and methods for physical measurements in an environment. For example, in one aspect the present technology can be utilized to detect distances between two or more points, in one dimension, two dimensions, and/or three dimensions, depending on the specific design and use of a given device, system, or method. Furthermore, such distance measurements can result in be absolute distance measurements, relative distance measurements, or any other measurement between two or more points, including fixed points and moving points. Moving points would thus include situations where one point is moving relative to another fixed point or multiple fixed points, as well as situations where multiple points are moving. Thus, the present technology can be utilized to measure location, distance, and changes in location and/or distance, track moving objects, measure velocity, acceleration, deceleration, and the like. Expansion or contraction of an object that causes variation in the distance between measurement points can also be tracked or monitored.

Accordingly, in one example, the currently disclosed subject matter provides a method of determining a distance between at least two points. The method can include splitting a beam of coherent light into separate component beams, and directing each component beam along a separate waveguide pathway toward and into an associated photodetector to generate a local photocurrent in each associated photodetector at each pathway. Each component beam can also be delivered through its associated photodetector to impinge on a photodetector in another pathway to generate an interference photocurrent at each photodetector. The difference between the interference photocurrents can be related to a distance between associated or corresponding photodetectors.

Additionally, the present disclosure provides an interferometer device including a signal or first photodetector, a reference or second photodetector, an optical beam source, and a waveguide configured to direct a split beam of coherent light through the first photodetector and into the second photodetector along a first pathway, and through the second photodetector and into the first photodetector along a second pathway. The system can also include an optical modulator and/or a lock-in amplifier. In one aspect, the present disclosure provides a system including an optical fiber interferometer having an optical fiber coupled to a coherent light source, where the fiber splits into at least two fiber channels.

The coherent light source can include any light generation device or system capable of introducing coherent light into the optical fiber. Non-limiting examples can include fiber lasers, solid state lasers, gas lasers, semiconductor lasers such as laser diodes, photonic crystal lasers, and the like, including appropriate combinations thereof. In one specific aspect, the light source can be a pigtailed laser diode.

Any output power can be employed that is suitable for use with the other components of the system, such as the photodetectors. Depending upon the application, output powers can range from 1 microwatt to more than 1 watt. In many applications, however, a 1-100 milliwatt power can be used. The output power can be chosen based upon a variety of criteria, such as the desired signal to noise ratio, detection bandwidth, saturation of the linear response of the photodetectors, and any light power safety issues related to the use of the interferometer in a particular environment. In some examples, it can be desirable to maximize the output power of the coherent light source without compromising the photodetector or photocurrent generated at the photodetector so as to maximize both the lateral and longitudinal measurement ranges of the divergent beam emitted from the optical fiber.

Further, any suitable wavelength of coherent light can be used in the current system and methods. However, as will be apparent to one skilled in the art, coherent light in the infrared and visible ranges can have a number of practical advantages. Thus, in one aspect, the light source of the current system can emit coherent light having a wavelength of from 400 nm to 1000 nm and higher. In some aspects, the light source can emit coherent light in the infrared range (i.e. having a wavelength from 750 nm to 1000 nm or higher, including both IR and near IR ranges). In some aspects, the light source can emit coherent light in the visible range (i.e. having a wavelength from 400 nm to 750 nm). However, different light sources can have different limitations with respect to the coherency of the light they emit (i.e. over longer distances the coherency of the light can diminish). Thus, some light sources may not be suitable for all applications of the current systems and methods (i.e. measurements over longer distances) if the frequency range for the light source isn't sufficiently narrow to generate an adequately coherent beam to produce an interference signal over the required distances.

It is noted that coherent light is delivered through the optical fiber; however, the light that is transmitted from an optical fiber through a photodetector and detected by another photodetector may or may not remain fully coherent, depending on the size of the waveguide, the size of the waveguide outlet, the size of the photodetector, the distance between photodetectors, and the like. While there must be sufficient coherence in the light to generate interference, the term "coherent" can include both spatial and temporal components. Both of these components are generally needed to generate the interference effects described. Both photodetectors that receive transmitted light from the opposite fiber channel should also utilize light that is not orthogonally polarized relative to the opposite fiber channel in order for the interference to occur.

The optical fiber can be any material capable of containing and transmitting coherent light along its length. Generally, optical fibers can be flexible, have minimal mass and are transparent waveguides. A variety of materials can be utilized as optical fiber materials including, without limitation, silica, transparent polymers, and the like, including appropriate combinations thereof. Furthermore, in some aspects optical fibers can include single mode fibers, while in other aspects multimode fibers can be used. In other aspects, light can be delivered without using optical fibers, and as such, any mechanism for delivering light that allows for interference to occur in the photodetectors is considered to be within the present scope. As one example, in some aspects standard bulk optical devices can be used to deliver light. However, due to the many practical advantages of single-mode optical fibers, specific reference will be made to this type of waveguide.

A variety of single-mode fibers can be used in the current systems and methods. In some aspects, single-mode fibers can be selected based on their numerical aperture. The numerical aperture of the single-mode optical fiber can control the angle at which the coherent beam of light will emerge from the fiber, thus controlling the lateral and longitudinal ranges of the light emitted from the optical fiber. For example, where it is desirable to emit the beam from the fiber end at a large angle (i.e. large lateral range), a fiber with a large numerical aperture can be selected. Conversely, where it is desirable to emit the beam from the fiber end at a narrow angle (i.e. large longitudinal range), a fiber with a small numerical aperture can be selected. Accordingly, the numerical aperture of the single-mode optical fiber can be selected based on a desire for greater lateral or longitudinal coverage of the coherent optical beam. Generally, increasing lateral coverage (i.e. the beam divergence), can compromise the longitudinal range of a detectable signal. Conversely, increasing the longitudinal range (i.e the distance over which an optical signal can be detected) can generally compromise the lateral coverage or breadth over which the optical signal will be detectable.

Accordingly, the current system can be used to measure a range of distances depending on the longitudinal and lateral coverage of the system. For example, for one-dimensional measurements on a single axis, the range of the current system can be large (10 meters, or even larger). In this geometry, the coherent beams emitted out of the fibers can be collimated with a lens or made nearly collimated rather than diverging, as will be discussed more fully below. However, when three-dimensional position measurements are desired, the reference and signal beams can be diverging and, therefore, at greater distances the power falling on a given detector from the other fiber can become smaller. Under these conditions, the noise can determine the maximum longitudinal and lateral distance that can be measured.

As a non-limiting example for illustrative purposes only, if the light emitted from the fiber which passes through the detector has a Gaussian shape with a beam waist of $2 \times 10^{-6}$ meters, then the divergence half angle will be 0.1 radian. This corresponds to an approximate effective photo detector area of $4 \times 10^{-12}$ meters$^2$. (using a simplifying assumption that the area is approximately equal to the square of the beam waist size. It is additionally noted that the photodetector area can be large if the reference beam is small). In this example, it is also assumed that the Gaussian beam has a power of 1 mW. The Gaussian beam will spread as it propagates toward another detector (with similar effective photodetector area). The beam intensity will drop as it spreads out. Assuming that a 6.3 nm resolution distance measurement is desired, requiring a photodetector current signal to noise ratio of 100. Under this condition, the power received by the other fiber/photodetector (with similar effective photodetector area=$4 \times 10^{-12}$ meter) can be $4.8 \times 10^{-12}$ watts (based upon calculated shot noise and a detection bandwidth of 1 kHz under conditions consistent with this example, as shown in example 1 below). The maximum area that the signal beam will have after spreading and reaching the other photodetector to produce this signal to noise ratio can be approximately $8\times10^{-4}$ meters$^2$, as determined by the following relationship: Maximum signal beam area=(signal power/minimum detected power)*(photodetector area)=$(1\times10^{-3}$ Watt/$4.8\times10^{-12}$ Watt)*$(4\times10^{-12}$ m$^2$)=$8\times10^{-4}$ m$^2$. In this example, this maximum beam area corresponds to an approximate beam width of approximately 2.8 cm. Thus, at a divergence angle of 0.1 radian, the beam can spread to a radius of approximately 2.8 cm and still be detected with a signal to noise ratio of 100 by a detector with an effective area of $4\times10^{-12}$ meters$^2$. This means that the two fiber/photodetectors can be laterally shifted by 2.8 cm without significant reduction in distance measurement resolution (6 nm). At this divergence angle (0.1 radian), the maximum longitudinal range of the measurement is approximately 28 cm. If the power is increased, or the bandwidth decreased or the divergence angle decreased, the longitudinal range can also be increased.

This can provide a signification amount of flexibility for performing 1D, 2D and 3D distance measurements. For 1D measurements, alignment of two fiber/detectors is not necessary, because measurements can be performed even if the detectors are not laterally aligned to better than 2.8 cm (with respect to this non-limiting example).

Continuing the non-limiting example, where several reference fibers/detectors are placed in a reference plane at a separation of less than 2.8 cm and each is configured to separately measure the distance between that reference fiber/detector and the signal fiber/detector, then measurement of the three dimensional position of the signal fiber/detector can be detected over a large lateral range (much larger than the individual lateral range of each detector pair (2.8 cm), using triangulation methods.

Where the divergence angle is 0.01 radian, corresponding to a Gaussian beam waist of approximately $2\times10^{-5}$ meters (effective detector area=$4\times10^{-10}$, then the longitudinal range will increase to approximately 28 meters (assuming a 1 mW power, signal to noise ratio of 100), with a lateral range of approximately 28 cm.

A suitable range can be any range at which a fiber/photodetector can detect an interfering optical signal from an associated fiber/photodetector. As shown above, the minimum detectable power of the interfering beams can be determined by the noise which dominates in the detection process and the bandwidth of the detection system. As is shown below, a heterodyne interference signal detected by a photodetector is proportional to the square root of the power of the reference and signal beams. The reference beam is the light that comes directly from the fiber and impinges on the detector at an adjacent side before proceeding to the photodetector associated with another fiber. The signal beam is the beam that has passed through the photodetector and is traveling towards another photodetector.

As previously discussed, an optical fiber can be split into separate fiber channels, thus splitting the beam of coherent light into separate component beams and directing each component beam along a separate waveguide pathway. One or multiple fiber channels can include an optical modulator, such as an acousto-optic modulator, an electro-optic modulator, a magneto-optic modulator, a mechano-optic modulator, a phase modulator, or other suitable device. In one specific example, a phase-modulator can be used. As such, coherent light delivered into the main optical fiber (such as, for example, a single mode fiber) is directed into each of the fiber channels, and the light in each one of the channels can be frequency shifted or modulated at a different frequency ($\Delta f_1$, $\Delta f_2$, $\Delta f_3$ . . . ) via frequency or phase modulation devices. It is noted that various types of modulation can be utilized, including without limitation, frequency modulation, phase modulation, amplitude modulation, frequency shifting, phase shifting, and the like, including combinations thereof. By using a different modulating frequency in each channel, interference between any pair of channels can be independently detected by measuring the heterodyne signal at the difference frequency of the two channels.

A semitransparent or optically thin photodetector can be positioned either near or at the termination of each fiber channel of the optical fiber. Any semitransparent or optically thin photodetector can be used, such as a semitransparent or optically thin photodiode having either a p-n junction or PIN junction. One specific example of a semitransparent photodetector 100 having a PIN junction is illustrated in FIG. 1. As illustrated in FIG. 1, a silicon wafer 101 can be centrally etched to provide a channel having a width W1 to increase the transparency of the photodetector 100. Alternatively, or in combination, the photodetector can be built on a transparent substrate, eliminating the need to create a channel. Feature 102 represents an oxide layer disposed on top of the silicon wafer 101. Features 103, 104, and 105 represent the n+ silicon layer, intrinsic silicon layer, and p+ silicon layer, respectively. Feature 106*a* represents a silicide or metal contact deposited on the p+ silicon layer. Feature 106*b* represents a silicide or metal contact deposited on the n+ silicon layer. Features 107*a* and 107*b* represent leads coupled to the contact layers 106*a* and 106*b*, respectively. As previously noted, FIG. 1 illustrates only one example of a suitable semitransparent or optically thin photodetector. As will be appreciated by one skilled in the art, many suitable variations or alternatives can be employed to prepare a suitable semi-transparent or optically thin photodetector.

Figure 2A:
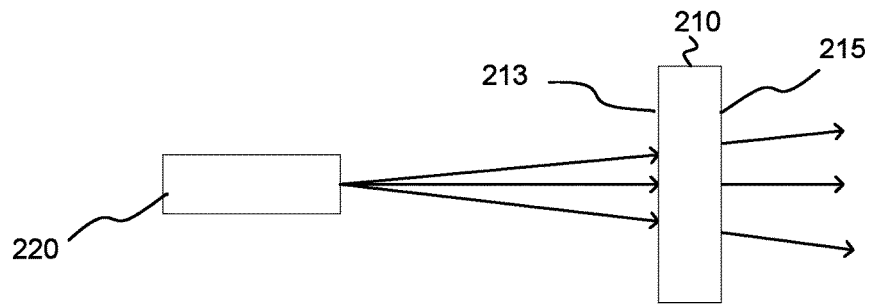
FIG. 2A is schematic diagram of an optical fiber emitting light through a photodetector in accordance with another aspect of the present disclosure.
Figure 2B:
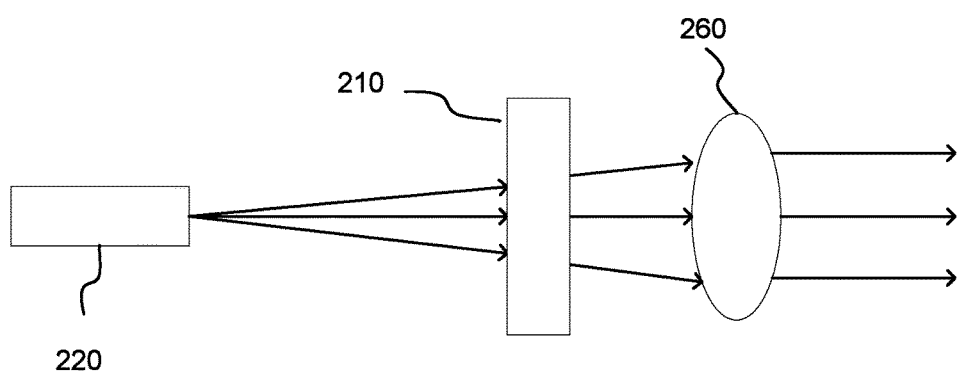
FIG. 2B is a schematic diagram of an optical fiber emitting light through a photodetector that additionally includes a lens in accordance with another aspect of the present disclosure.
Figure 3:
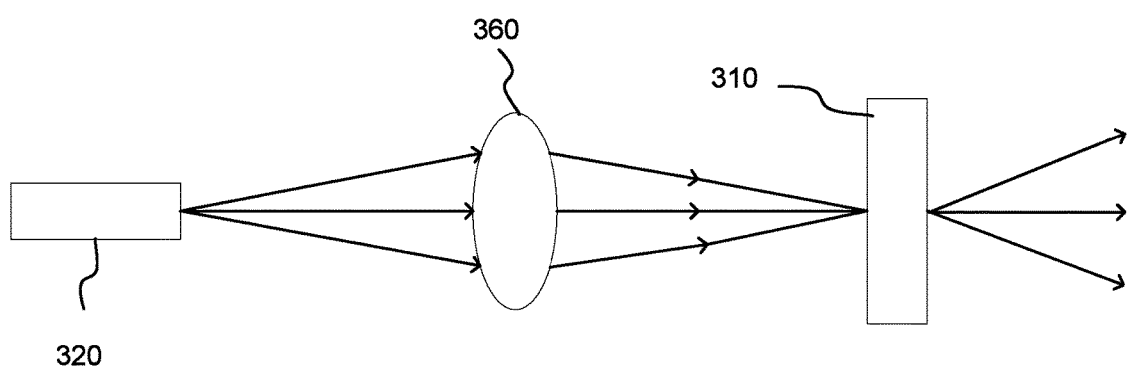
FIG. 3 is a schematic diagram of an optical fiber emitting light through a lens that refocuses the light on a photodetector in accordance with another aspect of the present disclosure.

The photodetector can be positioned so as to receive the coherent light from the associated channel. This can be accomplished using a number of configurations. In one aspect, the photodetectors can be fabricated on or coupled to the ends of the fiber channels of the optical fiber. In another aspect, as illustrated in FIG. 2A, an optical fiber 220 can emit light towards a photodetector 210. The light emitted from the end of the fiber 220 can impinge the photodetector 210 on an adjacent side 213. The light can then be emitted from an opposite side 215 of the photodetector 210 towards the opposite side of an associated reference photodetector (not shown). In a further aspect, as illustrated in FIG. 2B, the light emitted from the photodetector 210 can be collimated or nearly collimated and directed toward an associated photodetector. Alternatively, as illustrated in FIG. 3, a lens 360 can be positioned between the photodetector 310 and the optical fiber 320 to focus the coherent light emitted from the fiber onto the photodetector. After passing through the photodetector, the coherent light will diverge at an angle determined by the lens. In all cases, the photodetectors (210, 260, 310) can be larger than the coherent beam size. Under this condition, the effective heterodyne detection area is determined by the size of the reference beam (i.e. the beam coming from the fiber) as shown in FIG. 3.

A variety of lenses can be used, depending on a particular application, to change the angle of divergence of the coherent beam, to collimate and/or refocus the coherent light at a specific location. As non-limiting examples, graded index lenses or regular lenses can be used. Thus, similar to the numerical aperture of the optical fiber, the lens can also be used to control the beam divergence and the associated longitudinal or lateral coverage of the beam.

As previously noted, at least one fiber channel can be directionally oriented toward another fiber channel such that light passing through the associated photodetector will be emitted and impinge upon the photodetector directly associated with another fiber channel. Thus, a photodetector receives light from both sides, with each side coming from a different fiber channel, and where light from one of the fiber channels is frequency or phase shifted at a different frequency than the other fiber channel by a modulation device. As a result of light entering from both sides of the photodetector and the optical field variations associated with the optical interference of the two beams, charge carriers are generated in the photodetectors. Thus, each photodetector is receiving light from each side, where light from the two different sides are modulated at different frequencies (it is also possible that one may not be modulated). Under these conditions, a heterodyne signal at the difference frequency between the two modulation frequencies will be produced, which can be detected using a lock-in amplifier or other suitable device. It can be shown that by measuring the phase of the heterodyne signal at each photodetector of the two channels involved, and comparing these phases (taking their difference), the optical path length (phase delay) experienced by the light while in each of the fiber paths (before reaching the photodetector) is eliminated. Simultaneously, the difference phase between the heterodyne signals from the two detectors can be directly related to the distance between the two photodetectors or changes in the distance between the photodetectors.

Figure 4:
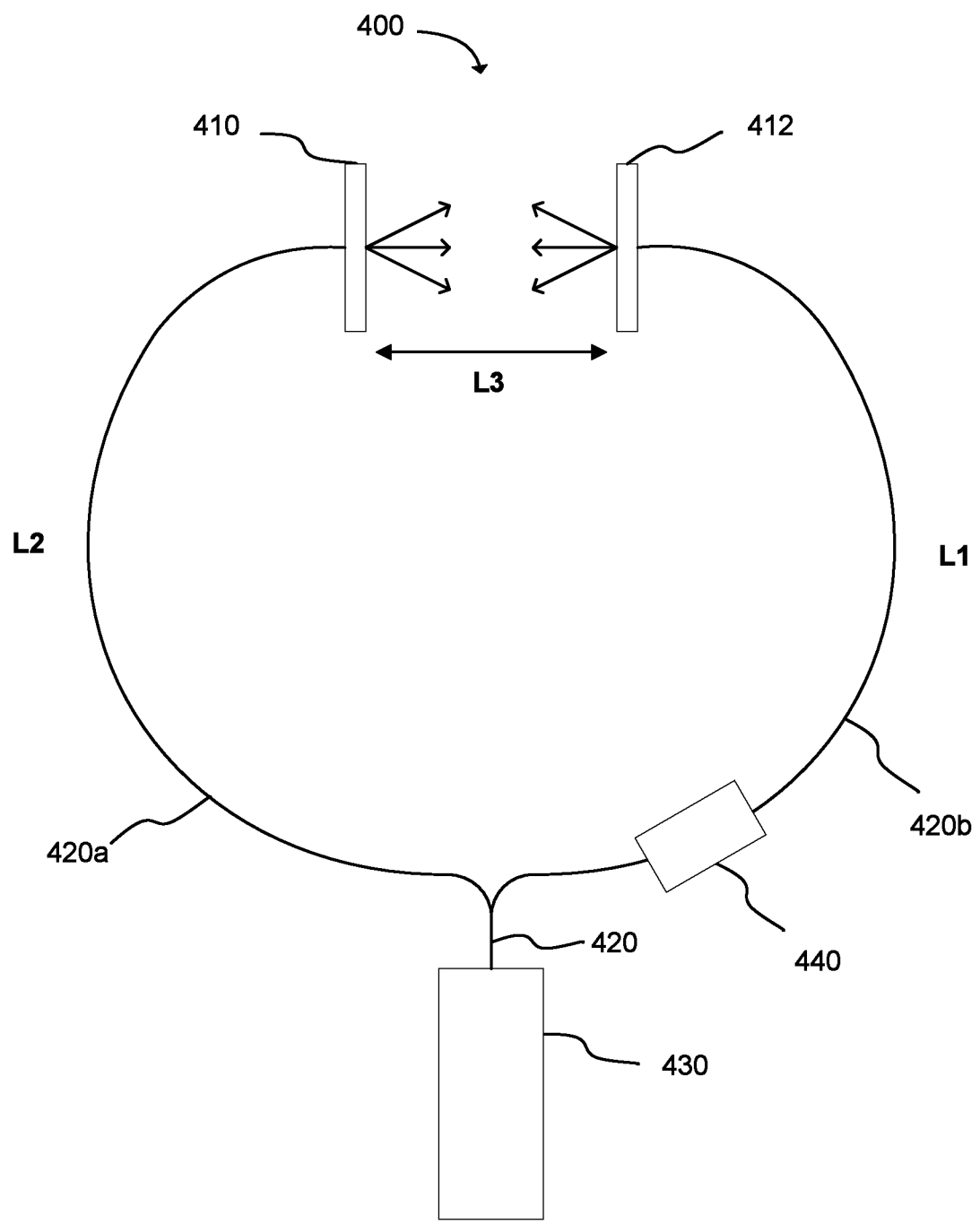
FIG. 4 is a schematic diagram of a system for measuring distance in accordance with another aspect of the present disclosure.

As is shown in FIG. 4, for example, a system for determining distance between two points can include a coherent light source 430 having an optical fiber 420 coupled thereto and operable to receive and transmit coherent light from the light source 430. The optical fiber 420 is split into at least two fiber channels 420a,b, through which coherent light is transmitted. Light in one fiber channel 420b is frequency shifted or otherwise modulated by a phase or frequency modulation device 440. A photodetector 410 or 412, in some cases a transparent photodetector, a semitransparent photodetector, or an optically thin photodetector, can be coupled at or to an end of each of the fiber channels 420a,b, as is the case in this particular example. Each photodetector thus receives light on one side directly from the fiber channel (reference beam) to which the photodetector is coupled. This can be referred to as the adjacent side. Additionally, when the fiber channels are directed toward one another, as shown in FIG. 4, each photodetector additionally receives transmitted light from the fiber channel to which the photodetector is not directly coupled (signal beam). This side of the photodetector can be referred to as the opposite side. So, in FIG. 4 for example, photodetector 410 would receive light at an adjacent side directly from the fiber channel 420a to which the photodetector 410 is coupled, and would also receive transmitted light at an opposite side from the fiber channel 420b to which the photodetector 410 is not directly coupled. The interference of the two light beams in each detector will produce charge carriers in each photodetector that will produce a measurable interference photocurrent (heterodyne signal).

Figure 5A:
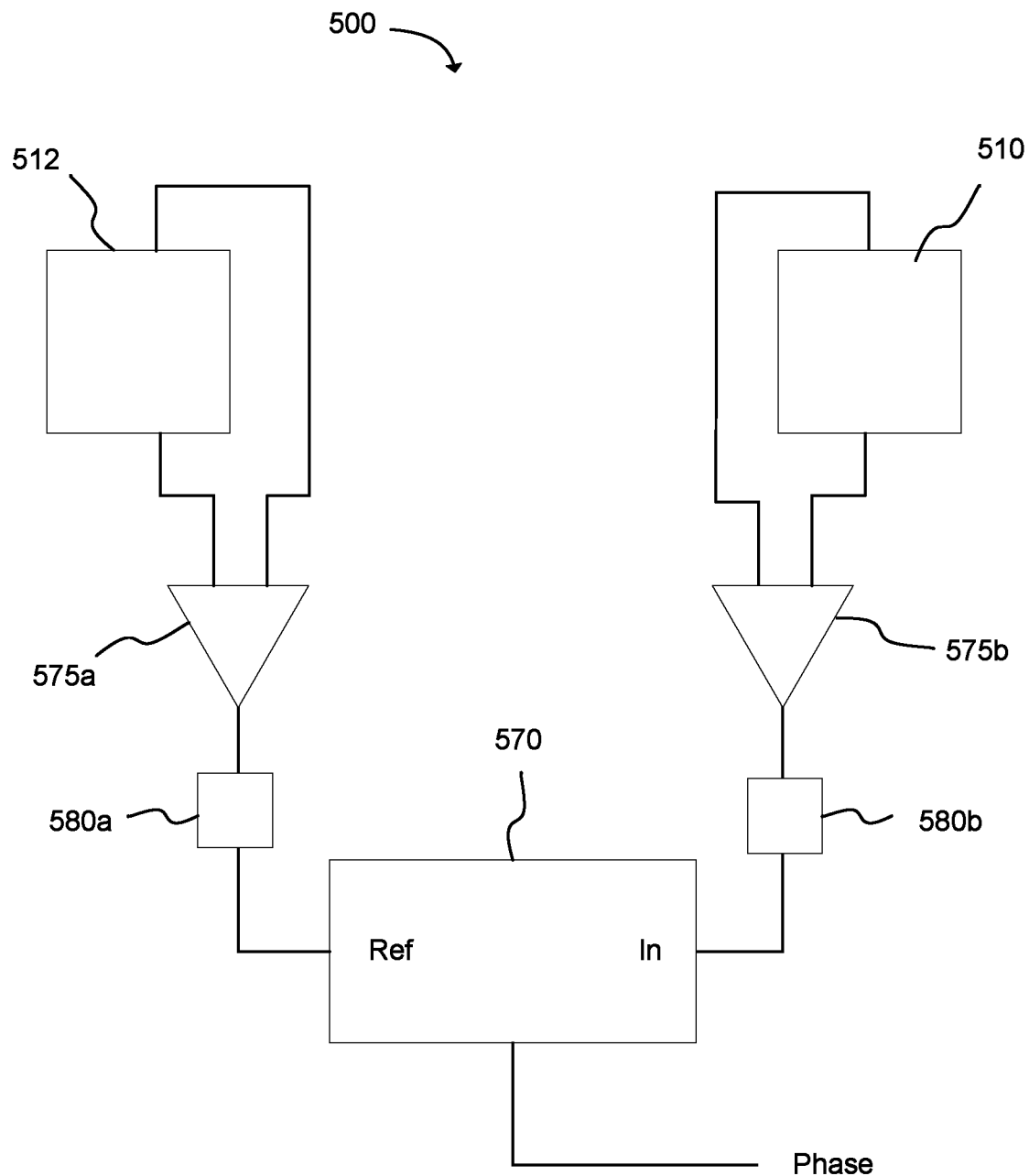
FIG. 5A is a schematic diagram of a circuit for measuring phase difference in accordance with another aspect of the present disclosure.
Figure 5B:
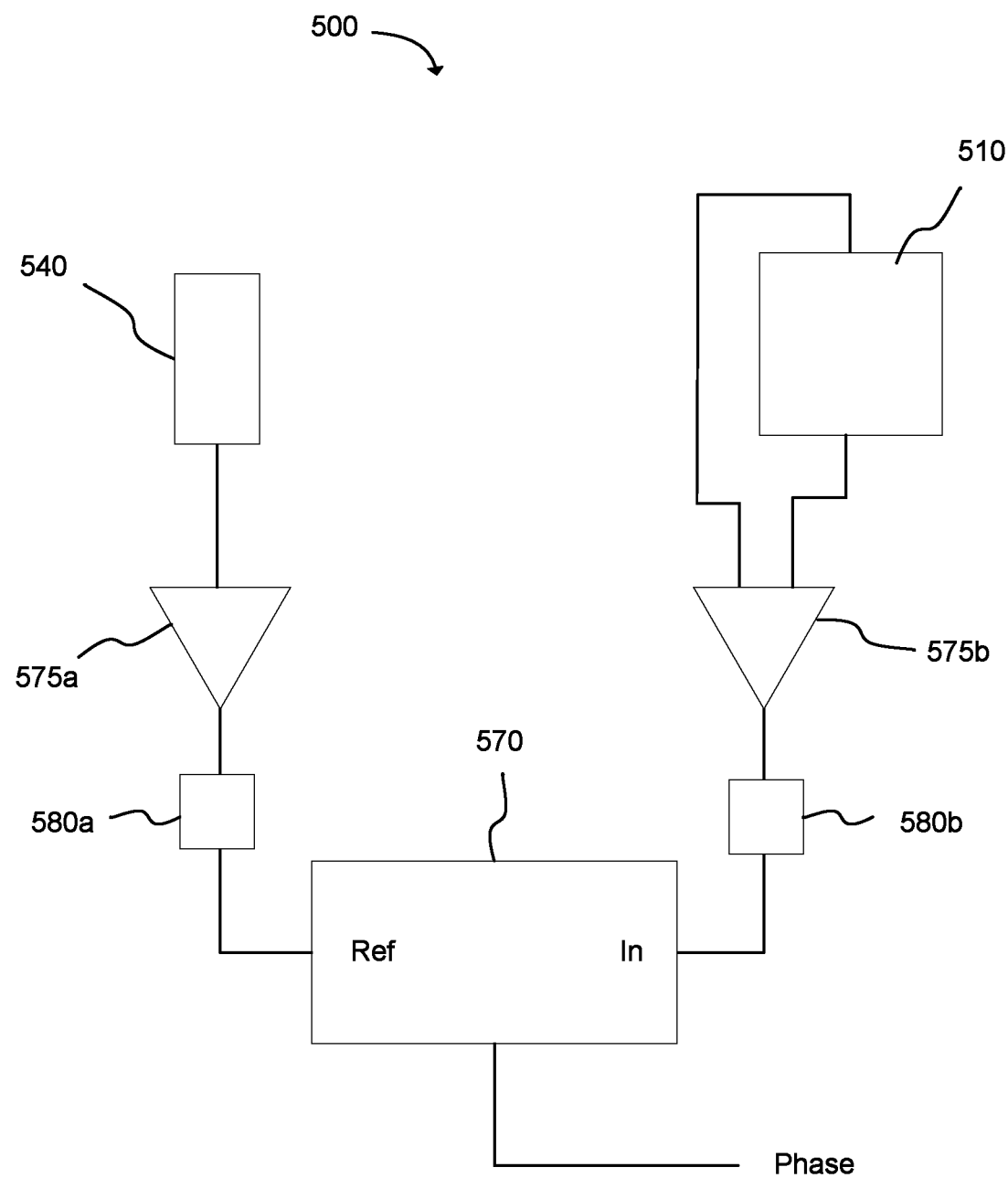
FIG. 5B is a schematic diagram of a circuit for measuring phase difference in accordance with another aspect of the present disclosure.

As illustrated in FIG. 5A, a lock-in amplifier 570 can be used to detect the photocurrents from each photodetector 510, 512. Respective photocurrents generated at photodetectors 510 and 512 can be amplified via amplifiers 575a,b. Optional filters 580a,b can be used to filter the signals before going into the lock-in amplifier 570. However, in many cases a lock-in amplifier can provide adequate signal filtering without the addition of supplemental filters. Thus, a lock-in amplifier can be used to reliably detect and extract the phase of the difference frequency signal coming from each of the two photodetectors. Alternatively, as illustrated in FIG. 5B, a frequency signal from an optical modulator 540 can be sent as a reference signal to the lock-in amplifier. While, FIG. 5B illustrates a signal coming from a single optical modulator, the signal can also come from multiple optical modulators, as is discussed more fully below.

Figure 6:
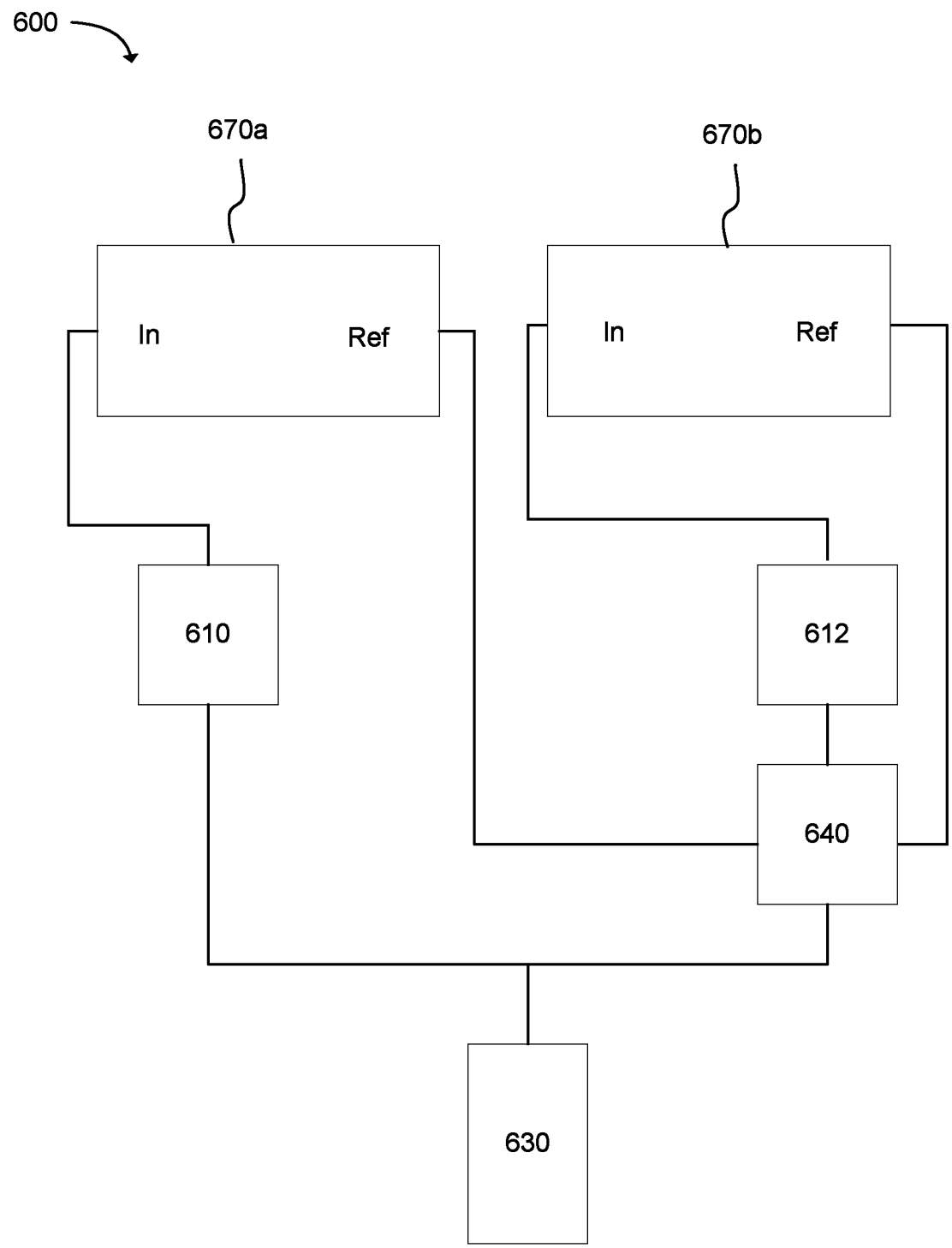
FIG. 6 is a schematic diagram of a system for measuring distance in accordance with one aspect of the present disclosure.
Figure 7:
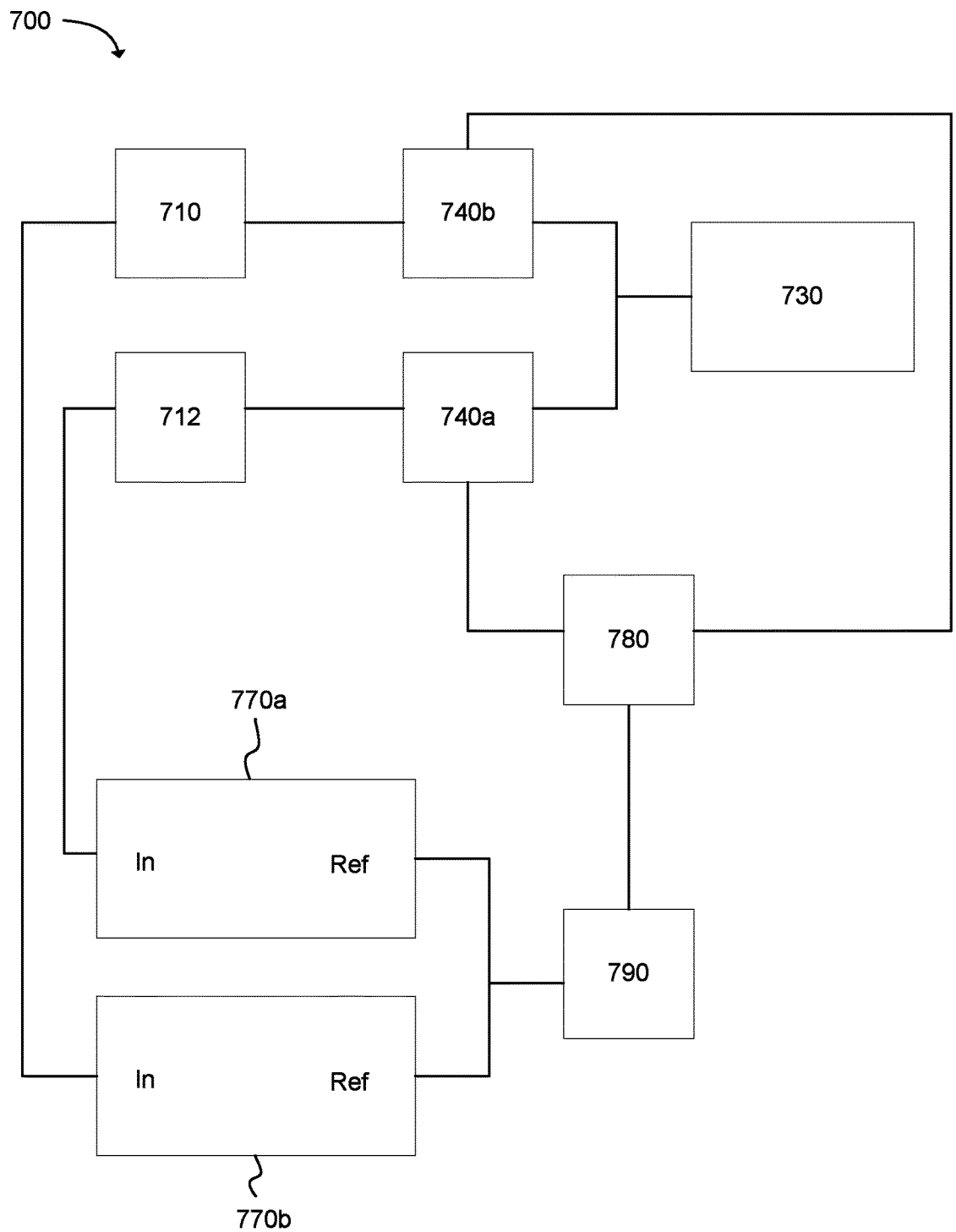
FIG. 7 is a schematic diagram of a system for measuring distance in accordance with one aspect of the present disclosure.

As is described in more detail below, the interference photocurrent from each of the photodetectors can be used to determine the distance or change in distance between the two detectors or fiber ends. It is noteworthy that the two heterodyne signals from the two photodetectors are at the same frequency (difference between the two modulation frequencies of the two channels or fiber arms). These can be detected by a single lock-in amplifier, if one signal is input as the reference to the lock-in amplifier and the other as the signal to the lock-in amplifier (as shown in FIG. 4). It is also possible to use two separate lock-in amplifiers, each detecting the heterodyne signal from each photodetector separately, using a lock-in amplifier reference produced directly from the modulators (electrical signal) at the difference frequency of the two modulators, and the lock-in signal coming directly from a single photodetector. In this scenario, the phase of each signal can be measured separately, and then the difference between the two signals can be determined by subtracting the two phase signals from the two lock-in amplifiers. For example, as illustrated in FIG. 6, the light from optical source 630 can be split into separate optical paths towards photodetectors 610, 612. The light directed towards photodetector 612 can be modulated via optical modulator 640. As illustrated, separate lock-in amplifiers 670a,b can each detect the heterodyne signal from each photodetector 610,612 separately, using a lock-in amplifier reference produced directly from the modulator 640 (electrical signal). In another example, as illustrated in FIG. 7, the light from optical source 730 can be split into separate optical paths towards photodetectors 710, 712, each optical path having an optical modulator 740a,b. The difference frequency of the two modulators 740a,b can be used as a reference signal for each heterodyne signal generated at photodetectors 710, 712. The reference signals can be sent to a mixer 780 to obtain $f_1+f_2$ and $f_1-f_2$ reference signals. A filter 790 can then be employed to remove reference signal $f_1+f_2$, allowing only the $f_1-f_2$ reference signal to be referenced in the lock-in amplifier. In this scenario, the phase of each heterodyne signal can be measured separately, and then the difference between the two signals can be determined by subtracting the two phase signals from the two lock-in amplifiers.

Distance can be determined using multiple detectors, including the termination of the fiber channels, a surface of the photodetectors, other photodetector structures, and the like, and as such, the locations of where distance measurements are taken from should not be seen as limiting the present scope. In one specific aspect, the distance is the distance between facing surfaces of the photodetectors. In other cases, distance can be a measure of changes in distance or location, and thus a distance from a reference point to a given position can be determined without knowing the exact location of the light detection in the photodetector.

Additionally, 2D or 3D measurements can be made using the principle of triangulation. For example, a 1D system can be constructed to measure changes in distance using a single pair of fibers and detectors. In this system, the divergence of the light will make it possible to move one of the two fibers/detectors laterally with respect to the other over a finite lateral range without losing the interference signal. The distance measured by this system will be the changes in absolute distance between the two detectors even when the two detectors are not aligned on a single axis. The distance measured will be the total 3 dimensional distance between the two detectors where the interference (heterodyne) signals are detected.

From this system, a 2D or 3D system can be constructed. This can be done by having one signal or positioning fiber/detector whose 3D position is of interest to be known, and then a series of other reference fiber/detectors which are fixed in a reference grid which is rigid. These reference detectors can be arranged such that each acts with the signal fiber/detector to uniquely measure the change in absolute 3D distance between them at any given time. This can be achieved by causing each reference fiber/detector to have a unique frequency shift in that arm that is different from all other fiber/detectors, thus enabling the interference signal from each pair of reference fiber/detectors to be independently detected. If the reference fiber/detectors are all laterally separated in space and fixed, by measuring the changes in 3D distance between the signal fiber/detector and all of the reference fiber/detectors, triangulation formulas can be used to uniquely determine the 3D position of the signal fiber relative to the known reference fiber/detectors. Thus, to have 3D knowledge of the signal fiber/detector, at least three reference fiber/detectors can be used. The light from a single laser source can be modulated (frequency shift, phase shift, amplitude) in each reference arm at a different frequency to provide a unique signal to that arm. Initial calibration procedures of the system of fibers may be necessary to establish the equations needed to extract the 2D or 3D position of the signal fiber. Once calibrated, these relationships will enable the 2D or 3D position to be determined at a rapid rate.

Figure 8:
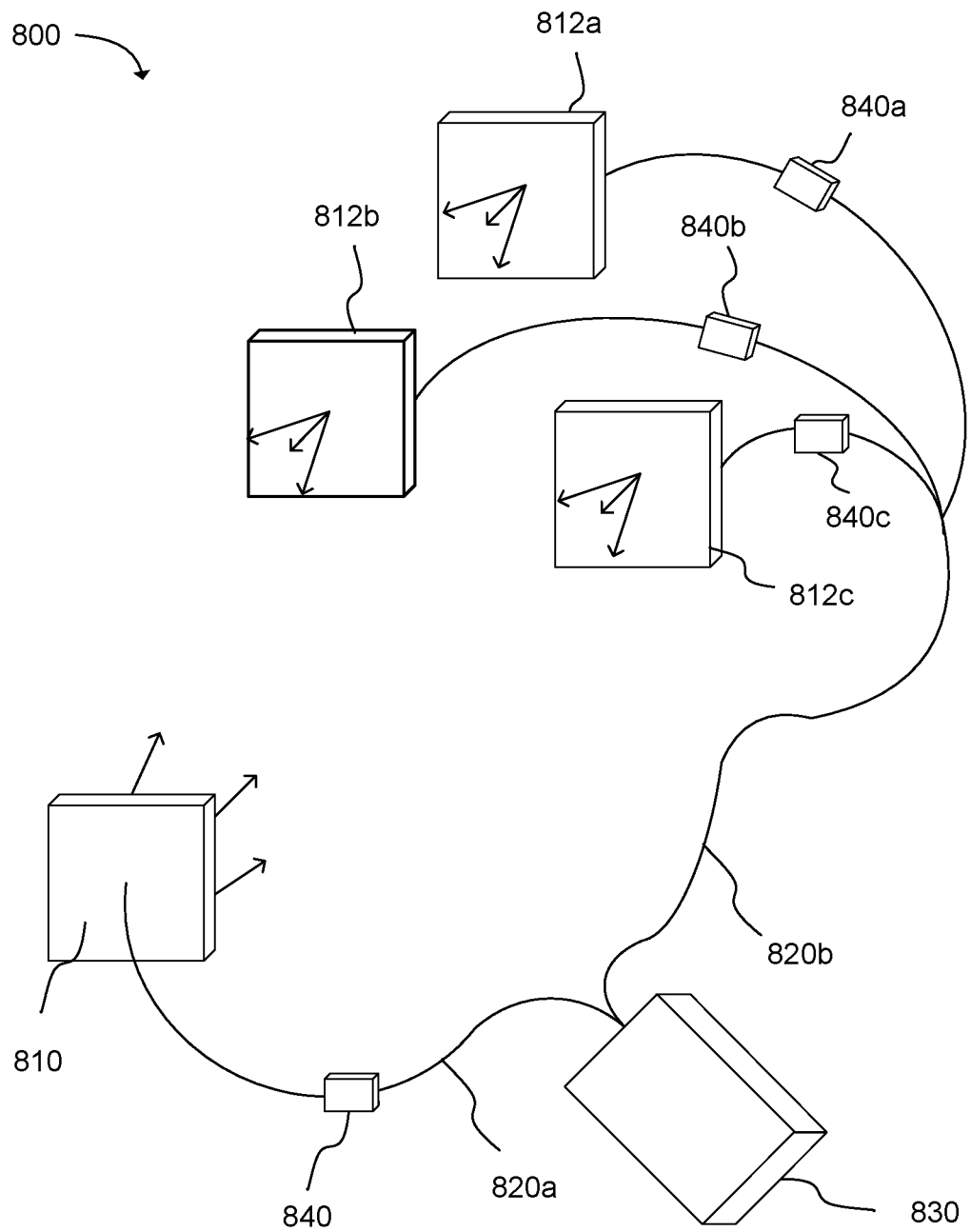
FIG. 8 is a schematic diagram of a system for measuring distance in accordance with one aspect of the present disclosure.

FIG. 8 illustrates one specific example of a system 800 employing multiple detectors. Specifically, an optical beam source 830 can direct a reference beam along optical path 820a toward an adjacent side of a signal photodetector 810. In some examples, an optical modulator 840 can be included in this path. This will produce a local or initial photocurrent at the signal photodetector 810. A signal beam can be emitted from the signal photodetector 810 toward an opposite side of a reference photodetector 812a, b, c. The reference beam can be considered the coherent optical beam propagating along the optical fiber and toward the adjacent side of a photodetector. The signal beam can be considered the coherent optical beam emitted from the opposite side of a photodetector toward an opposite side of another photodetector. Accordingly, a reference beam can also be directed along optical path 820b, but this reference beam can be modulated via optical modulators 840a, b, c to have distinct optical frequencies from one another and the reference beam of optical path 820a. These modulated reference beams can be directed toward an adjacent side of each reference detector 812a, b, c to produce a local or initial photocurrent at each reference photodetector 812a, b, c. A modulated signal beam can be emitted from each reference photodetector 812a, b, c toward the opposite side of the signal photodetector 810. Accordingly, a signal interference photocurrent can be detected at the signal photodetector 810 that is generated by the reference beam and the modulated signal beam(s) and an interference photocurrent can be detected at each reference photodetector generated by respective modulated reference beams and the signal beam. The difference between the signal interference photocurrent and the reference interference photocurrent can be related to a distance between the signal photodetector and the reference photodetectors. More specifically, the reference photodetectors 812a, b, c can have fixed or known reference positions. As the signal photodetector 810 moves relative to the reference photodetectors 812a,b,c, the position of the signal photodetector can be determined via triangulation equations.

While FIG. 8 illustrates an example having only three reference photodetectors, any reasonable number of photodetectors can be used. For example, a bank of reference photodetectors can be used. This can overcome the lateral limitations of only having three reference photodetectors. Thus, where a signal photodetector is within the range of at least three reference photodetectors, the position of the signal photodetector can be determined via triangulation. When the signal photodetector moves beyond the range of the beam width of one reference photodetector, the signal photodetector can move into the range of another reference photodetector on the bank of photodetectors. As such, the position of signal photodetector can still be determined via triangulation.

Calibration of the interferometer system can be accomplished in a number of ways. In one example, a separate calibrated positioning system can be used to accurately scan the signal photodetector laterally and at different ranges while near a single reference photodetector. During the scan, the distance between the two photodetectors can be measured interferometrically using the present methodology. This distance data could then be fitted to triangulation formulas, which can be used to uniquely determine the location of the reference fibers and the 3D position of the signal detector relative to the reference locations. Once calibrated, the location of the signal detector can be determined without the calibrated positioning system. As has been described, a given photodetector receives light from both sides, the adjacent side coming from the optical fiber with which the photodetector is directly associated, and the opposite side coming from an optical fiber directed toward the photodetector to which a distance measurement is to be determined. In one aspect, the photodetectors can be thin enough to allow overlap of the electrical fields from both sides to detect interference signals (i.e. heterodyne signals, if one fiber signal is frequency modulated relative to the other fiber signal), where the difference between phase between the two detector heterodyne signals is used to detect the distance or change in distance between the two detectors and to eliminate dependence on the optical path differences in the two fiber arm paths to the photodetectors. More specifically, the optical interference of the two waves in the photodetectors produce charge carriers in the photodetector, and the resulting photocurrent contains a heterodyne signal in each detector that can be compared to detect the change in distance between the two detectors. Without intending to be bound by any scientific theory, the photocurrents produced in each detector include a static (dc) and a time varying photocurrent. The photocurrent in each detector can be sinusoidal or sinusoidal-like, having a frequency of about the frequency difference $\Delta f$ between the optical beams in the two arms of the interferometer.

The following describes the optical phase difference $\Delta \varphi$ between the two paths (the optical wave number $k_0=2\pi/\lambda_0$). The description uses the terms detector # and $L_n$ for convenience, and these terms refer to the diagram in FIG. 4. At detector #1, there will be a sinusoidal photo-current (heterodyne signal) at the difference frequency (Δf) with a phase as shown by Equation I:

$$\Delta\varphi_1 = k_0((L_2+L_3)-L_1) \quad \text{I}$$

At detector #2, there will be a sinusoidal photo-current (heterodyne signal) at the difference frequency (Δf) with a phase as shown by Equation II:

$$\Delta\varphi_2 = k_0(L_2-(L_3+L_1)) \quad \text{II}$$

If the phase at each detector is measured by, for example, a lock-in amplifier, and the difference $\Delta\varphi_{12}$ between the phases is measured, the result is as shown in Equation III:

$$\Delta\varphi_{12} = \Delta\varphi_1 - \Delta\varphi_2 = 2L_3 k_0 \quad \text{III}$$

As can be seen, the difference phase $\Delta\varphi_{12}$ is dependent upon the distance L3 between the fiber ends and the optical k-vector $k_0$, which depends upon the wavelength and is not dependent upon $L_1$ or $L_2$.

One advantage of the presently disclosed technology pertains to the size of the photodetectors and how such size relates to alignment between detectors. As the size of the detector decreases, the acceptance angle with good optical interference increases. Without wishing to be bound by theory, the strength of the optical heterodyne signal is proportional to the square root of the power of each of the two beams incident on each detector. The photocurrent is proportional to the strength of the optical heterodyne signal as shown in Equation IV:

$$\text{Optical heterodyne power} = 2\text{alpha} \sqrt{P_1 P_2} \quad \text{IV}$$

I=Current=alpha*optical heterodyne power=alpha$^2$ sqrt (P1*P2) alpha is responsivity of the detector.

The magnitude of the current I is proportional to the optical heterodyne signal, which is proportional to the square root of $P_1$, the power of the signal detected on the adjacent side of the detector, and $P_2$, the power of the signal detected on the opposite side of the detector. Because the power $P_1$ of the signal on the adjacent side of the detector is already high, an adequate heterodyne photo-current can be generated even by a low-power divergent beam $P_2$. It is noteworthy that when the photodetector is larger or much larger than the reference beam area, the heterodyne interference signal will dominantly be generated only in the region where the reference beam is appreciable. Therefore, the effective size of the photodetector in detecting a heterodyne signal will be the size of the reference beam on the detector. Furthermore, due to the typically small effective size of the photodetector area, the overall heterodyne signal will be reduced generally. It should be noted that the photodetector area described is the effective photodetector area, and that the actual size of the a given photodetector can be much larger.

However, the heterodyne signal depends only on the square root of the weak reference signal (divergent beam). Because of the small effective size of the photodetector, precise alignment of the signal and reference detectors is not as critical to determine distance. In other words, a larger diameter coherent light beam (reference beam) passing through a proportionally large photodetector must be aligned to a tighter angular tolerance as compared to a smaller diameter reference beam. For example, photodetectors that use visible light (say, 0.5 um wavelength as an example) that are approximately 1 mm in diameter would require an approximate angular alignment tolerance within $4\times10^{-4}$ radians in order to achieve good (efficient) interference in distance measurement.

Photodetectors with an effective size of about 2 microns in size (reference beam widths of about 2 microns), on the other hand, would have an approximate angular tolerance of $1.6\times10^{-1}$ radians in order to efficiently produce interference. Thus, as the size of the photodetector decreases, the angular tolerance increases.

Furthermore, without wishing to be bound by theory, the smaller the diameter of the reference beam from each of the fiber channels, the greater the divergence of the beam can be, thus increasing the divergence angle of the beam and the corresponding lateral range in which the opposite photodetector can be placed to detect interference signals. Hence, choice of optical fiber can be based on the size of the fiber core. Single-mode fibers can have a core with a diameter less than 15 microns or less than 10 microns or less than a 1-2 microns. In one aspect, single-mode fibers can be preferred due to their small core size and the corresponding smaller diameter incidence beam that will increase the diffraction angle of the light emitted and therefore the lateral detection range of the opposite small photodetector. The photodetectors can be built on the fiber end to cover about the same surface area as the fiber core outlet or larger. In one aspect, the photodetector can be made from crystalline silicon to be about the size of the fiber optic core with a diameter of about 1-5 microns. Photodetectors can also be positioned near the end of a fiber with or without a lens. A lens enables the effective photodetector area to be adjustable, by focusing the reference beam on a detector at different widths.

Additionally, because the incident beam can be very small and the divergence angle can be large, three dimensional measurements can be made using two, three or more detectors. The interference signals detected by each of the detectors can be used to measure the distance between each of the detectors relative to the other detectors and triangulate the position of any one of the photodetectors relative to the others in three dimensions.

The small size and weight of the fiber elements and the corresponding broad detection ranges and angles can allow the current technology to be applied in a large variety of devices and applications. One of the advantages of the current technology is that it does not require the sophisticated equipment and time constraints for highly accurate beam alignment required by some other interferometric methods. It also uses relatively inexpensive materials for lower cost production. Hence, the current technology can be useful and desirable in many machines, devices and services. In some examples, an interferometer system can be operatively coupled to a machine, such as metrology equipment, manufacturing equipment, robots, vehicles, machining tools and the like. In one aspect, the current technology can be used in metrology to properly calibrate engineering equipment, measurement equipment, and other equipment. In another aspect, the current technology can be used for metrology in micro-fabrication of semiconductors and other similar devices to ensure proper alignment of wafers or other substrates and components, to evaluate surfaces, and to perform any other suitable micro-fabrication tasks. In one aspect, the multiple fibers can be coupled to robotic arms to accurately position the arms relative to a reference frame to grasp or otherwise engage or avoid an object. The robot arms could be part of a stationary robot or as part of an ambulatory robot. The robot could be used in assembly lines, military applications in drones or other equipment, in home consumer products or services, or for various other products and purposes. The robot could have three or more detectors to give it three dimensional measurement capability, as previously described. One way to accomplish this would be by using three or more arms, appendages, or other measurable locations on the robot, each with a photodetector or set of photodetectors. Additionally, positional information about the robot or other device can be measured by placing one or more photodetectors in locations away from the robot or other device. The distance measurement can also be used to measure angles and other geometric quantities. The current technology can also be used in a variety of other devices, systems, and methods. It can also measure velocity, acceleration, etc.

Though the photodetectors of the current technology can be coupled to the ends of fiber optic channels, they need not be in some aspects. The photodetectors can be coupled to any arrangement of light sources that are capable of generating suitable interference patterns at each detector, which can then be used to determine the distance between the photodetectors.

Examples

The following examples pertain to specific embodiments and point out specific features, elements, or steps that can be used or otherwise combined in achieving such embodiments.

In one example, a method of determining a distance between at least two points may include splitting a beam of coherent light into separate component beams, directing each component beam along a separate waveguide pathway toward and into an associated photodetector to generate a local photocurrent in the associated photodetector at each pathway, delivering each component beam through its associated photodetector to impinge on a photodetector in another pathway to generate an interference photocurrent at each photodetector, and relating a difference between interference photocurrents to a distance between corresponding photodetectors.

In one example, the method may further include focusing at least one component beam on an associated photodetector using a lens.

In one example, the method can further include delivering each component beam through each associated photodetector to impinge on the photodetector in another pathway further comprises delivering each component beam through a lens to impinge on the photodetector in another pathway.

In one example, the beam of coherent light has a wavelength of from 400 nm to 1000 nm.

In one example, each waveguide pathway is comprised of a single-mode optical fiber.

In one example, one component beam is modulated relative to another component beam.

In one example, the modulated component beam is frequency modulated.

In one example, the modulated component beam is phase modulated.

In one example, multiple component beams are modulated relative to one another.

In one example, at least one photodetector is a reference photodetector having a fixed position.

In one example, the interference photocurrent is detected using a lock-in amplifier.

In one example, the interference photocurrent is detected using a separate lock-in amplifier at each photodetector.

In one example, interferometer device can include a first photodetector, a second photodetector, an optical beam source, and a waveguide configured to direct a split beam of coherent light from the optical beam source through the first photodetector and into the second photodetector along a first pathway, and through the second photodetector and into the first photodetector along a second pathway.

In one example, the interferometer device can include an optical modulator positioned to modulate the beam of coherent light that is directed through the first or the second photodetector.

In one example, the optical modulator includes a member selected from the group consisting of an acousto-optic modulator, an electro-optic modulator, a magneto-optic modulator, a mechano-optic modulator, a phase shifter, and a combination thereof.

In one example, the optical modulator is a phase modulator.

In one example, the interferometer device can include multiple optical modulators positioned to modulate the beams of coherent light that are directed through the first and the second photodetectors.

In one example, both the first photodetector and the second photodetector are optically thin PIN photodetectors.

In one example, the optical beam source is operable to emit a beam of coherent light having a wavelength of from 400 nm to 2000 nm.

In one example, the waveguide is a single-mode optical fiber.

In one example, the interferometer device can include a lock-in amplifier operatively coupled to the first photodetector, the second photodetector, or both.

In one example, the interferometer device can include a first optical modulator positioned along the first pathway to modulate the beam of coherent light that is directed through the first photodetector, a second optical modulator positioned along the second pathway to modulate the beam of coherent light that is directed through the second photodetector, and a lock-in amplifier operatively coupled to the first photodetector and the second photodetector, wherein a reference input to the lock-in amplifier is derived from using an electrical reference signal from the frequency or phase modulators.

In one example, an interferometer device can include an optical beam source, a first photodetector, a first waveguide pathway extending from the optical beam source to the first photodetector, a first modulator optically coupled along the first waveguide pathway, and operable to modulate a coherent beam in the first waveguide pathway, a second photodetector, a second waveguide pathway extending from the optical beam source to the second photodetector, a second modulator optically coupled along the second waveguide pathway, and operable to modulate a coherent beam in the second waveguide pathway, a mixer operably coupled to the first modulator and the second modulator, the mixer configured to determine a difference frequency between the two modulators, and at least one lock-in amplifier functionally coupled to a least one of the first photodetector or the second photodetector, wherein the difference frequency from the mixer is delivered to the lock-in amplifier as a reference signal.

In one example, the interferometer device can include a filter functionally coupled to the mixer and configured to filter an addition frequency from the difference frequency of the mixer output.

In one example, a method of determining a distance between at least two points including directing a reference beam toward an adjacent side of a signal photodetector, emitting a signal beam from the signal photodetector toward an opposite side of a reference photodetector, directing a modulated reference beam toward an adjacent side of the reference photodetector, emitting a modulated signal beam toward an opposite side of the signal photodetector, detecting a signal interference photocurrent at the signal photodetector generated by the reference beam and the modulated signal beam, detecting a reference interference photocurrent at the reference photodetector generated by the modulated reference beam and the signal beam, and relating a difference between the signal interference photocurrent and the reference interference photocurrent to a distance between the signal photodetector and the reference photodetector.

In one example, the reference beam is directed toward the adjacent side of the signal photodetector using a single-mode optical fiber, a lens or lenses, or a combination thereof.

In one example, the modulated reference beam is directed toward the adjacent side of the reference photodetector using a single-mode optical fiber, a lens or lenses, or a combination thereof.

In one example, the method can further include directing the signal beam toward the opposite side of the reference photodetector using a lens or lenses.

In one example, the method can further include directing the modulated signal beam toward the opposite side of the signal photodetector using a lens or lenses.

In one example, the signal interference photocurrent and the reference interference photocurrent are detected using a lock-in amplifier.

In one example, the signal interference photocurrent and the reference interference photocurrent are detected using separate lock-in amplifiers.

In one example, the number ratio of reference photodetectors to signal photodetectors is at least 2:1.

In one example, the number ratio of reference photodetectors to signal photodetectors is at least 3:1.

Maple Code Example—

Maple code showing one example of modeling the operation of a system according to the present disclosure.

```
> restart; with(plots) :
> Digits := 15 :
>
> #program to calculate electric fields counterpropagating and interfering and power absorbed by
    semiconductor detectors
> #Optical field E1(z,r) comes from the left and enters detector 1 at z = 0. Optical field E2(z,r)
    comes from the right and enters the detector 2 at z = z0. Detector thickness is L in both cases
    (L very small, less than the absorption depth in the detectors) Optical fields have amplitude
    E01 and E02 as they enter the detector from either side.
> #optical constants c = 3·10^8 meters per second, impedance of free space = eta, electron charge = e
> c := 2.998·10^8 : η := 377 : e := 1.6·10^-19 :
> #optical wavelength and wavevector in free space k0
> lambda0 := 6.33 · 10^(-7) : k0 := evalf( 2·π / λ0 ) :
> #fiber mode size
> w01 := evalf(2·10^-6); w02 := evalf(2·10^-6);
```
$$w01 := 0.00000200000000000000$$
$$w02 := 0.00000200000000000000 \qquad (1)$$

```
> #power in fibers (reference power) in watts
> Popt1 := evalf(1·10^-3); Popt2 := evalf(1·10^-3);
```
$$Popt1 := 0.00100000000000000$$
$$Popt2 := 0.00100000000000000 \qquad (2)$$

```
> #detector areas
> area1 := evalf( Pi·w01^2 / 2 ); area2 := evalf( Pi·w02^2 / 2 );  #meters,watts,meters, meters^2
```
$$area1 := 6.28318530717958 \; 10^{-12}$$
$$area2 := 6.28318530717958 \; 10^{-12} \qquad (3)$$

```
> #divergence angles
> theta1 := evalf( lambda0 / Pi·w01 ); theta2 := evalf( lambda0 / Pi·w02 );
```
$$\theta 1 := 0.100745078977170$$
$$\theta 2 := 0.100745078977170 \qquad (4)$$

```
> z0 := 1.0·10^-3; #distance between fiber 1 and fiber 2
```
$$z0 := 0.00100000000000000 \qquad (5)$$

```
> #Optical frequencies (made very small for ease in displaying heterodyne signal on graphs.
    Actually, frequency will be in the 10^14 Hz range
> f1 := 10; f2 := 11; df := f2 − f1; dw := 2·Pi·df;
```
$$f1 := 10$$
$$f2 := 11$$

$$df := 1$$
$$dw := 2\pi \qquad (6)$$

> 
> \> # optical properties of silicon photodetector n = 3.5, k = 0.02, alpha = linear absorption coefficient (meter$^{-1}$), responsivity $\left(\dfrac{amps}{watt}\right)$
> 
> \> # dI/dz = alpha * I, where alpha = linear abs coeff = 4 * Pi * k / lambda0; E = E0 * exp(-kz); I = I0 * exp(-2kz)
> 
> \> #n := 3.5;k:= 0.02;a:= evalf$\left(\dfrac{4\cdot\pi\cdot k}{\lambda 0}\right)$; responsivity := 0.33; #crystalline silicon
> 
> \> # optical properties of amorphous silicon photodetector n = 4.52, k = 0.232, alpha = linear absorption coefficient (meter$^{-1}$
> 
> \> n := 4.51979; k := 0.23286; alpha := evalf$\left(\dfrac{4\cdot Pi\cdot k}{lambda 0}\right)$; responsivity := 0.33; #amorphous silicon (RefractiveIndex.info)

$$n := 4.51979$$
$$k := 0.23286$$
$$\alpha := 4.62275681083678 \cdot 10^6$$
$$responsivity := 0.33 \qquad (7)$$

> \> #thickness of detectors L
> 
> \> $L := 0.5\cdot 10^{-7}; z0 := 1.0\cdot 10^{-4};$ #meters $$L := 5.00000000000000 \cdot 10^{-8}$$
$$z0 := 0.000100000000000000 \qquad (8)$$

> 
> \> #Calculate the electric field E01 and E02 for Gaussian beams with width w01 and w02 with power Popt1 and Popt2
> 
> \> #power1 = $\dfrac{(Pi\cdot w01^2\cdot E0^2)}{4\cdot eta}$ therefore $E01 = \dfrac{\text{sqrt}(4\cdot eta\cdot Pop1)}{Pi\cdot w01^2}$
> 
> \> E01 := evalf$\left(\text{sqrt}\left(\dfrac{4\cdot eta\cdot Popt1}{Pi\cdot w01^2}\right)\right)$; E02 := evalf$\left(\text{sqrt}\left(\dfrac{4\cdot eta\cdot Popt2}{Pi\cdot w02^2}\right)\right)$;

$$E01 := 3.46414242044535 \cdot 10^5$$
$$E02 := 3.46414242044535 \cdot 10^5 \qquad (9)$$

> \> #define waists as a function of z
> 
> \> $w1 := (z) \to w01\cdot\text{sqrt}\left(1 + \left(\dfrac{z\cdot lambda0}{Pi\cdot w01^2}\right)^2\right)$; $w2 := (z) \to w02\cdot\text{sqrt}\left(1 + \left(\dfrac{z\cdot lambda0}{Pi\cdot w02^2}\right)^2\right)$;
> 
> evalf$\left(w1\left(\dfrac{z0}{2}\right)\right)$; evalf$\left(w2\left(\dfrac{z0}{2}\right)\right)$;

$$w1 := z \to w01\sqrt{1 + \dfrac{z^2\lambda 0^2}{\pi^2 w01^4}}$$

$$w2 := z \rightarrow w02 \sqrt{1 + \frac{z^2 \lambda 0^2}{\pi^2 w02^4}}$$

$$0.00000541977189052182$$
$$0.00000541977189052182 \qquad (10)$$

> #define radius of curvatures R1 and R2 at a distance $z = \frac{z0}{2}$ from waist > $R1 := (z) \rightarrow z \cdot \left(1 + \left(\frac{Pi \cdot w01^2}{z \cdot lambda0}\right)^2\right); R2 := (z) \rightarrow -(z0-z) \cdot \left(1 + \left(\frac{Pi \cdot w02^2}{(z0-z) \cdot lambda0}\right)^2\right); evalf\left(R1\left(\frac{z0}{2}\right)\right); evalf\left(R2\left(\frac{z0}{2}\right)\right);$ $$R1 := z \rightarrow z \left(1 + \frac{\pi^2 w01^4}{z^2 \lambda 0^2}\right)$$

$$R2 := z \rightarrow -(z0-z)\left(1 + \frac{\pi^2 w02^4}{(z0-z)^2 \lambda 0^2}\right)$$

$$0.0000578821065922663$$
$$-0.0000578821065922663 \qquad (11)$$

> #Input guassian beam optical field 1 for light beam from fiber 1 with waist at z = 0 and width w01 propagating in the +z direction (on axis only) including attenuation of light as it passes through the detector $\exp\left(-\frac{k}{2} \cdot L\right)$

- detector between z = -L to z = 0; (only valid on axis), note L is the thickness of the detector > $E1 := (z, r, t)$ $$\rightarrow \frac{E01 \cdot \exp\left(-\frac{alpha}{2} \cdot L\right) \cdot \exp(I \cdot 2 \cdot Pi \cdot fI \cdot t) \cdot \exp\left(-\frac{r^2}{(w01(z))^2}\right) \cdot \exp\left(-\frac{I \cdot k0 \cdot r^2}{2 \cdot R1(z)}\right)}{\text{sqrt}\left(1 + \left(\frac{z \cdot lambda0}{Pi \cdot w01^2}\right)^2\right)} \cdot \exp($$

$-I \cdot k0 \cdot z);$ $$E1 := (z, r, t) \rightarrow \frac{E01 \, e^{-\frac{1}{2} \alpha L} \, e^{2I\pi fI \, t} \, e^{-\frac{r^2}{w01(z)^2}} \, e^{-\frac{1}{2} I k0 \frac{r^2}{R1(z)}} \, e^{-I k0 z}}{\sqrt{1 + \frac{z^2 \lambda 0^2}{\pi^2 w01^4}}} \qquad (12)$$

> $evalf\left(polar\left(E1\left(\frac{z0}{2}, 0, 0\right)\right)\right);$ $$polar(1.13881658130297 \, 10^5, 0.0694823019773317) \qquad (13)$$

> #Input guassian beam optical field for light beam 2 from fiber 2 with waist at z = z0 and width w02 propagating in the -z direction
(on axis only) with an arbitrary phase (phi) representing the phase difference between the two arms of the interferometer; the expression includes the electric field attenuation $\left(\exp\left(-\frac{alpha}{2} \cdot L\right)\right)$ due to the beam passing through the detector 2

> E2 := (z, r, t, z0, phi)

$$\rightarrow \frac{1}{\text{sqrt}\left(1 + \left(\frac{(z0-z) \cdot lambda0}{Pi \cdot w02^2}\right)^2\right)} \left(E02 \cdot \exp\left(-\frac{alpha}{2} \cdot L\right) \cdot \exp(I \cdot 2 \cdot Pi \cdot f2 \cdot t)\right.$$

$$\left. \cdot \exp\left(-\frac{r^2}{(w2(z))^2}\right) \cdot \exp\left(-\frac{I \cdot k0 \cdot r^2}{2 \cdot R2(z)}\right) \cdot \exp(I \cdot phi)\right) \cdot \exp(-I \cdot k0 \cdot (z0-z));$$

$$E2 := (z, r, t, z0, \phi) \rightarrow \frac{E02 \, e^{-\frac{1}{2}\alpha L} \, e^{2 I \pi f2\, t} \, e^{-\frac{r^2}{w2(z)^2}} \, e^{-\frac{\frac{1}{2} I k0\, r^2}{R2(z)}} \, e^{I\phi} \, e^{-I k0\,(z0-z)}}{\sqrt{1 + \frac{(z0-z)^2 \lambda 0^2}{\pi^2 \, w02^4}}} \quad (14)$$

> $evalf\left(polar\left(E2\left(\frac{z0}{2}, 0, 0, z0, 0\right)\right)\right);$ $$polar(1.13881658130297 \cdot 10^5, 0.0694823019773317) \quad (15)$$

> #check average intensity at detectors 1 & 2 (without interference)

> $Pave1 := evalf\left(\frac{\left(abs\left(E1\left(\frac{z0}{2}, 0, 0\right)\right)\right)^2 + abs\left(E2\left(\frac{z0}{2}, 0, 0, z0, 0\right)\right)^2 \cdot area1}{2 \cdot \eta}\right); Pave2$ $$:= evalf\left(\frac{\left(abs\left(E1\left(\frac{z0}{2}, 0, 0\right)\right)\right)^2 + abs\left(E2\left(\frac{z0}{2}, 0, 0, z0, 0\right)\right)^2 \cdot area2}{2 \cdot \eta}\right);$$

$$Pave1 := 0.000216145442117626$$
$$Pave2 := 0.000216145442117626 \quad (16)$$

> #Detector 1 exists between z=-L and z=0. Light from fiber 1 comes from the left and propagates towards the right (positive z), passing through detector 1 which sits between z = -L and 0. It light from fiber 1 intercepts detector 2 at z=z0, which exists between z = z0 and z = z0 + L (detector thickness is L). Note that I have neglected the phase delay and amplitude decay of the light associated with propagation through the detector thicknesses L, assuming that the phase delay is constant. This may not be the case if the intensities are very high.

> #Total electric field coming from both fiber 1 and 2

> $Etot := (z, r, t, z0, phi,) \rightarrow E1(z, r, t) + E2(z, r, t, z0, phi); \#evalf\left(polar\left(Etot\left(\frac{z0}{2}, 0, 0, z0, 0\right)\right)\right);$ $$Etot := (z, r, t, z0, \phi) \rightarrow E1(z, r, t) + E2(z, r, t, z0, \phi) \quad (17)$$

> #total intensity at any point in space due to both optical fields

> $Intensity := (z, r, t, z0, \text{phi}) \rightarrow \left(\left(\dfrac{Etot(z, r, t, z0, \text{phi}) \cdot conjugate(Etot(z, r, t, z0, \text{phi}))}{2 \cdot \eta}\right)\right);$ $\left(evalf\left(Intensity\left(\dfrac{z0}{2}, 0, 0, z0, 0\right)\right)\right);$ $Intensity := (z, r, t, z0, \phi) \rightarrow \dfrac{1}{2} \dfrac{Etot(z, r, t, z0, \phi) \overline{Etot(z, r, t, z0, \phi)}}{\eta}$ $6.88012310796065 \ 10^7 + 2.034701308082 13 \ 10^{-9} \ I$     (18)

> $\#plot\left(Intensity\left(\dfrac{z0}{2}, 0, t, z0, 0\right), t = 0 .. \left(\dfrac{1}{df}\right)\right);$ > #animate(plot,[[Intensity(z,0,t,z0,0)],z=-L..0],t=0..1,frames=20); #power between z = -L and 0 as a function of time > #calulate differential absorption in detector 1 as a function of z and t (note that dI/dz = alpha * I, where alpha = linear abs coeff = 4 * Pi * k / lambda0)

> $dPD1absdz := (z, r, t, z0, \text{phi}) \rightarrow (\alpha \cdot Intensity(z, r, t, z0, \text{phi}) \cdot area1); evalf\left(dPD1absdz\left(\dfrac{z0}{2}, 0, 0, z0, 0\right)\right);$ $dPD1absdz := (z, r, t, z0, \phi) \rightarrow \alpha \ Intensity(z, r, t, z0, \phi) \ area1$ $1998.37562936115 + 5.90991969663439 \ 10^{-14} \ I$     (19)

> $\#animate\left(plot, \left[[dPD1absdz(z, 0, t, z0, 0)], z = \dfrac{z0}{2} .. \dfrac{z0}{2} + L\right], t = 0 .. 1, frames = 20\right);$ > #Calculate the total absorbed power as a function of time in detector 1 at location d (fibers remain at z = 0 and z = z0)

> $d := \dfrac{z0}{2};$ $d := 0.0000500000000000000$     (20)

> PD1:=(t,z0,phi)->int(dPD1absdz(z,0,t,z0,phi),z=d-L..d);evalf(PD1(0,z0,0));

$PD1 := (t, z0, \phi) \rightarrow \displaystyle\int_{d-L}^{d} dPD1absdz(z, 0, t, z0, \phi) \ dz$ $0.0000921097610029867$     (21)

> $\#plot(PD1(t, z0, 0), t = 0 .. 10, numpoints = 10);$

> #Detector 2 exists between z=z0 and z=z0+L. Light from fiber 2 comes from the right, originating at z = z0 and propagates toward the left, incepting detector 1 at z=0. The optical field from fiber 2 therefore has a form exp(wt+ kz +phi), where phi is an arbitrary phase introduced to represent the path length difference between fiber 2 and fiber 1. Note that we have neglected the phase delay of the light and attenuation associated with propagation through detector 2, assuming that the phase delay is constant. This may not be the case if the intensities are very high.

> #calulate differential absorption in detector 2 as a function of z and t (note that dI/dz = alpha * I, where alpha = linear abs coeff = 4 * Pi * k / lambda0)

> $dPD2absdz := (z, r, t, z0, \text{phi}) \rightarrow (\alpha \cdot \text{Intensity}(z, r, t, z0, \text{phi}) \cdot area2);\ evalf\left(dPD2absdz\left(\frac{z0}{2}, 0, 0, z0, 0\right)\right);$ $$dPD2absdz := (z, r, t, z0, \phi) \rightarrow \alpha\, \text{Intensity}(z, r, t, z0, \phi)\, area2$$

$$1998.37562936115 + 5.90991969663439\, 10^{-14}\, I \tag{22}$$

> $\#animate\left(plot,\left[\,[dPD2absdz(z, 0, t, z0, 0)]\,\right], z = \frac{z0}{2}\,..\,\frac{z0}{2} + L\right], t = 0\,..1, frames = 20\right);$ > #Calculate the total absorbed power as a function of time in detector 2
> $PD2:=(t,z0,\text{phi})\text{->}int(dPD2absdz(z,0,t,z0,\text{phi}),z=d..d+L);evalf(PD2(0,z0,0));$ $$PD2 := (t, z0, \phi) \rightarrow \int_{d}^{d+L} dPD2absdz(z, 0, t, z0, \phi)\, dz$$

$$0.0000921097610029721 \tag{23}$$

> $\#plot\left(\,[PD1(t, z0, \text{phi}), PD2(t, z0, \text{phi})]\,, t = 0\,..\left(\frac{1}{df}\right), numpoints = 10\right);$ >
>
> #*solve for the offset* a1, *the amplitude* b1 *and intrinsic phase* *theta1* *of PD1 (as a function of z0 and* phi*) by fitting the simulated data to the following set of 3 equations* : $a1 + b1 \cos(0 + theta1) = PD1(0, z0, \text{phi}),\ a1 + b1 \cos\left(\frac{\text{Pi}}{2} + theta1\right) = PD1\left(\frac{\text{Pi}}{2 \cdot dw}, z0, phi\right),\ a1 + b1 \cos(\text{Pi} + theta1) = PD1\left(\frac{\pi}{dw}, z0, \text{phi}\right).$ > $\#Rearranging:\ \cos(0 + theta1) = \dfrac{(PD1(0, z0, \text{phi}) - a1)}{b1};\ \cos\left(\dfrac{\text{Pi}}{2} + theta1\right)$ $= \dfrac{\left(PD1\left(\dfrac{\pi}{2 \cdot dw}, z0, \text{phi}\right) - a1\right)}{b1};\ \cos(\text{Pi} + theta1) = \dfrac{\left(PD1\left(\dfrac{\pi}{dw}, z0, \text{phi}\right) - a1\right)}{b1}$ > #knowing that cos(0+theta1) = (PD1(0,z0, phi)-a1)/b1 and (cos((1/2)*Pi+theta1)) = (PD1(Pi/(2* dw), z0, phi)-a1)/b1), you can solve for a1: a1 = (PD1(0,z0,phi)+PD1(Pi/dw,z0,phi))/2;
> #taking the ratio of the first and second equations yields:

$$\tan(theta1) = -\dfrac{\left(PD1\left(\dfrac{\text{Pi}}{2 \cdot dw}, z0, \text{phi}\right) - a1\right)}{(PD1(0, z0, \text{phi}) - a1)};$$

> #*solve to find the value for a1,b1 and theta1 corresponding to PD1*
> $a1 := (z0, \text{phi}) \rightarrow evalf(PD1(0, z0, \text{phi}) + PD1(\text{Pi}/dw, z0, \text{phi}))/2;\ (a1(z0, 1));$ $$a1 := (z0, \phi) \rightarrow \frac{1}{2}\, evalf\left(PD1(0, z0, \phi) + PD1\left(\frac{\pi}{dw}, z0, \phi\right)\right)$$

$$0.0000499594260544799 \tag{24}$$

> $theta1 := (z0, \text{phi}) \rightarrow evalf\left(\arctan\left(-\frac{\left(PD1\left(\frac{\text{Pi}}{2 \cdot dw}, z0, \text{phi}\right) - a1(z0, \text{phi})\right)}{(PD1(0, z0, \text{phi}) - a1(z0, \text{phi}))}\right)\right);$
$(theta1(z0, 0));\#radians$ $$\theta 1 := (z0, \phi) \rightarrow evalf\left(\arctan\left(-\frac{PD1\left(\frac{1}{2}\frac{\pi}{dw}, z0, \phi\right) - a1(z0, \phi)}{PD1(0, z0, \phi) - a1(z0, \phi)}\right)\right)$$
$$-0.496302209832181 \qquad (25)$$

> #plugging a and theta back into the first equation provides the value of b
> $b1 := (z0, \text{phi}) \rightarrow evalf\left(\frac{(PD1(0, z0, \text{phi}) - a1(z0, \text{phi}))}{\cos(0 + theta1(z0, \text{phi}))}\right); (b1(z0, 0));\#power$ $$b1 := (z0, \phi) \rightarrow evalf\left(\frac{PD1(0, z0, \phi) - a1(z0, \phi)}{\cos(\theta 1(z0, \phi))}\right)$$
$$0.0000479335475087897 \qquad (26)$$

> $PD1fit := (t, z0, \text{phi}) \rightarrow a1(z0, \text{phi}) + b1(z0, \text{phi}) \cdot \cos(dw \cdot t + theta1(z0, \text{phi})); PD1fit(t, z0, 0);$ $$PD1fit := (t, z0, \phi) \rightarrow a1(z0, \phi) + b1(z0, \phi)\cos(dw\, t + \theta 1(z0, \phi))$$
$$0.0000499594260544798 + 0.0000479335475087897\cos(2\pi t - 0.496302209832181) \qquad (27)$$

> $\#plot([PD1fit(t, z0, 0), PD1(t, z0, 0)], t = 0..10, numpoints = 10);$
> ################################################
> #now solve to find the value for a2,b2 and theta2 corresponding to PD2
> $a2 := (z0, \text{phi}) \rightarrow evalf(PD2(0, z0, \text{phi}) + PD2(\text{Pi}/dw, z0, \text{phi}))/2; (a2(z0, 0));$ $$a2 := (z0, \phi) \rightarrow \frac{1}{2} evalf\left(PD2(0, z0, \phi) + PD2\left(\frac{\pi}{dw}, z0, \phi\right)\right)$$
$$0.0000499594260544730 \qquad (28)$$

> $theta2 := (z0, \text{phi}) \rightarrow evalf\left(\arctan\left(-\frac{\left(PD2\left(\frac{\text{Pi}}{2 \cdot dw}, z0, \text{phi}\right) - a2(z0, \text{phi})\right)}{(PD2(0, z0, \text{phi}) - a2(z0, \text{phi}))}\right)\right);$
$\#(theta2(z0, 3));\#radians$ $$\theta 2 := (z0, \phi) \rightarrow evalf\left(\arctan\left(-\frac{PD2\left(\frac{1}{2}\frac{\pi}{dw}, z0, \phi\right) - a2(z0, \phi)}{PD2(0, z0, \phi) - a2(z0, \phi)}\right)\right) \qquad (29)$$

> #arctan(-10000.);
> #plugging a and theta back into the first equation provides the value of b
> $b2 := (z0, \text{phi}) \rightarrow evalf\left(\frac{(PD2(0, z0, \text{phi}) - a2(z0, \text{phi}))}{\cos(0 + theta2(z0, \text{phi}))}\right); (b2(z0, 0));\#power$ $$b2 := (z0, \phi) \rightarrow evalf\left(\frac{PD2(0, z0, \phi) - a2(z0, \phi)}{\cos(\theta 2(z0, \phi))}\right)$$
$$0.0000479335475087836 \qquad (30)$$

> $PD2fit := (t, z0, \text{phi}) \rightarrow a2(z0, \text{phi}) + b2(z0, \text{phi}) \cdot \cos(dw \cdot t + theta2(z0, \text{phi}));\#PD2fit(t, z0,$ $$PD2fit := (t, z0, \phi) \rightarrow a2(z0, \phi) + b2(z0, \phi) \cos(dw\, t + \theta2(z0, \phi)) \tag{31}$$

```
> #plot([PD2fit(t, z0, 0), PD2(t, z0, 0)], t = 0 ..10, numpoints = 10);
> #input values for phi, z0 and dz0;
> phi := 0.0;
```

$$\phi := 0. \tag{32}$$

```
> z0 := 1.0·10⁻⁰;
```

$$z0 := 1.0 \tag{33}$$

```
> dz0 := 0.06·lambda0 + lambda0/8;
```

$$dz0 := 1.17105000000000\, 10^{-7} \tag{34}$$

```
> #plot([PD1fit(t, z0 + dz0, phi), PD2fit(t, z0 + dz0, phi)], t = 0 ..10);
> #calculate the difference in phase deltatheta for two different values of phi - this shows that the
    phase difference (deltatheta) does not depend upon the phase difference of one arm of the fiber
    compared to the other
> deltatheta := (z0, phi) → evalf((theta2(z0, phi) − theta1(z0, phi))); deltatheta(z0, 2);
```

$$deltatheta := (z0, \phi) \rightarrow evalf(\theta2(z0, \phi) - \theta1(z0, \phi))$$
$$0.992604366315522 \tag{35}$$

```
> deltatheta := (z0, phi) → evalf((theta2(z0, phi) − theta1(z0, phi))); deltatheta(z0, 1.5);
```

$$deltatheta := (z0, \phi) \rightarrow evalf(\theta2(z0, \phi) - \theta1(z0, \phi))$$
$$0.992604366311576 \tag{36}$$

While the forgoing examples are illustrative of the specific embodiments in one or more particular applications, it will be apparent to those of ordinary skill in the art that numerous modifications in form, usage and details of implementation can be made without departing from the principles and concepts articulated herein. Accordingly, no limitation is intended except as by the claims set forth below.

What is claimed is:

1. A method of determining a distance between at least two points, comprising:
    splitting a beam of coherent light into first and second component beams;
    directing the first component beam along a first waveguide pathway toward and into a first photodetector to generate a local photocurrent in the first photodetector at the first waveguide pathway;
    directing the second component beam along a second waveguide pathway toward and into a second photodetector to generate a local photocurrent in the second photodetector at the second waveguide pathway;
    delivering the first component beam through the first photodetector to impinge on the second photodetector to generate an interference photocurrent at the second photodetector;
    delivering the second component beam through the second photodetector to impinge on the first photodetector to generate an interference photocurrent at the first photodetector; and
    relating a difference between the interference photocurrents to a distance between the first and second photodetectors.

2. The method of claim 1, further comprising focusing at least one of the first and second component beams on a photodetector using a lens.

3. The method of claim 1, wherein delivering the first and second component beams through the respectively first and second photodetectors to impinge on the second and first photodetectors further comprises delivering the first and second component beams through a lens to impinge on the second and first photodetectors.

4. The method of claim 1, wherein the beam of coherent light has a wavelength of from 400 nm to 1000 mu.

5. The method of claim 1, wherein each of the first and second waveguide pathways is comprised of a single-mode optical fiber.

6. The method of claim 1, wherein at least one of the first and second component beams is modulated relative to the other component beam.

7. The method of claim 6, wherein the modulated component beam is frequency modulated.

8. The method of claim 6, wherein the modulated component beam is phase modulated.

9. The method of claim 6, wherein both the first and second component beams are modulated relative to one another.

10. The method of claim 1, wherein at least one of the first and second photodetectors is a reference photodetector having a fixed position.

11. The method of claim 1, wherein the interference photocurrent is detected using a lock-in amplifier.

12. The method of claim 11, wherein the interference photocurrent is detected using a separate lock-in amplifier at each of the first and second photodetectors.

* * * * *